Patented Mar. 2, 1948

2,437,148

UNITED STATES PATENT OFFICE 2,437,148

PREPARATION OF FLUORINE HYDROCARBON COMPOUNDS

Arthur Livingston Barney, Wilmington, Del., assignor to E. I. du Pont de Nemours & Company, Wilmington, Del., a corporation of Delaware No Drawing. Application January 11, 1944, Serial No. 517,837

4 Claims. (Cl. 260—653)

1

This invention relates to novel catalytic compositions for synthesizing organic compounds and to novel methods for preparing said compositions and compounds.

More particularly, the invention pertains to new, highly useful catalyst compositions adapted to promote the conversion of hydrocarbons containing an acetylenic unsaturation to the corresponding substituted or unsubstituted vinyl fluoride, e. g., vinyl fluoride, fluoroprene (fluoro-2-butadiene-1,3), etc., said composition comprising catalytic compounds of mercury in admixture with an alkaline earth metal salt, especially at least one of the fluorides, sulfates, and phosphates of the alkaline earth metals.

Catalysts useful in synthesizing organic compounds composed of catalytically-active metals or their oxides which are supported on charcoal as a substrate are well-known. Those which contain mercury oxide produced by impregnating the charcoal with a suspension of mercury oxide or by forming said oxide in situ on the charcoal, such as through the decomposition of certain mercury salts, are also known. Similarly, in the co-pending application of Leroy F. Salisbury, Serial No. 508,243, filed October 29, 1943, now U. S. Patent No. 2,426,792, highly useful charcoal-supported mercuric compounds are disclosed as employable in the synthesis of vinyl fluoride and fluoroprene. Although these catalysts, and especially said charcoal-supported mercuric compound types, are advantageously useful for their designed purpose, at times they are characterized by certain disadvantages. Thus, a large part of the total mercury present on the charcoal as the mercuric compound may be lost as free mercury during the catalyst preparation operation, thus reducing the activity of the catalyst. Secondly, charcoal-supported mercury catalysts, although initially very active in the fluoroprene synthesis, tend to gradually become less active. For instance, in 12 to 16 hours these compositions may frequently lose 50% of their original activity.

I have found that these disadvantages in prior charcoal-supported mercury catalysts may be effectively overcome and hence a salient object of my invention is to provide a new and improved type of catalytic composition useful in the synthesis of unsaturated fluorohydrocarbons, especially vinyl fluoride, fluoroprene and the like. A particular object of the invention is to provide compositions which are catalytically active in the synthesis of fluoroprene from monovinyl acetylene and hydrogen fluoride and which are also free of the stated disadvantages of charcoal-supported mercury catalysts. A further object is to provide a novel, improved type of durable, highly active catalytic composition comprising catalytic compounds of mercury in admixture with a support comprising certain alkaline earth metal salts. Other objects and advantages of the invention will be evident from the ensuing description thereof.

These and other objects are attainable in this invention which comprises a catalytic composition containing a compound of mercury in admixture with an alkaline earth metal salt which is substantially unreactive with hydrogen fluoride and said mercury compound.

In a more specific and preferred embodiment, the invention comprises a catalytic composition consisting of mercury oxide at least partially combined chemically with an oxide of nitrogen (preferably in the form of basic mercuric nitrate) in admixture with at least one of the fluorides, sulfates and phosphates of the alkaline earth metals.

In one practical and preferred adaptation of the invention, granular, anhydrous calcium sulfate or finely-divided, powdered plaster of Paris is impregnated in a suitable manner with a compound of mercury, preferably mercuric nitrate. This is conveniently effected by adding a sufficient quantity of a solution of mercuric nitrate in water to the finely-divided sulfate to form a relatively thick slurry or suspension. The resulting mixture or dispersion is then roasted in a suitable retort, preferably at a temperature ranging from 165° C.–200° C., to expel the free and combined water, decompose the mercuric nitrate, and form mercuric oxide at least partially combined chemically with an oxide of nitrogen. Preferably, said roasting operation is conducted under such conditions as to provide a changing atmosphere about the mass undergoing heat-treatment about every five minutes, such as by passing a dry, gaseous medium, such as air, through said reaction mass. The roasting operation is continued until such time as either free mercury appears in the colder portions of the exit end of the reaction zone or retort, or until the moisture content of the reaction mass is below about 2%, and preferably below 1%. Alternatively, and if desired, the roasting operation may be conducted under a reduced or diminished pressure of from about 1–30 mm. of mercury, in which event circulation of the dry air or other gas through the retort is dispensed with. After the desired roasting the mass is cooled and is ready for use as a catalyst composition in fluoroprene synthesis without further treatment.

To a clearer understanding of the invention, the following specific examples are given which are merely illustrative of and not to be construed as limiting the scope of my invention:

Example I

Granular, anhydrous calcium sulfate (1100 parts) is mixed with 600 parts of water containing 162 parts of mercuric acetate. The resulting mixture is then evaporated essentially to dryness on a steam bath, following which it is roasted for 3.5 hours at 200° C. under a pressure of 10–30 mm. of mercury.

This composition is employed as catalyst for the vapor phase synthesis of fluoroprene from monovinylacetylene and hydrogen fluoride by passing a mixture of 18 parts of nitrogen, 13 parts of monovinylacetylene, and 5 parts of hydrogen fluoride at about 50° C. and a contact time of about 50 seconds (time required to pass a volume of gas equal to the volume of catalyst) through the catalyst so prepared. During a run of 7 hours duration, conversion of monovinylacetylene to fluoroprene occurs at a uniform rate of about 23%.

Example II

Calcium fluoride (1800 parts) is mixed with about 600 parts of an aqueous solution containing 450 parts of mercuric nitrate. The product is dried at 100° C. and is then formed into pellets under pressure. The pellets are roasted for 16 hours at 165° C. under a slow stream of dry air. No free mercury is formed during the roasting.

The resulting composition is employed as a catalyst in the synthesis of fluoroprene in the following manner. A mixture of 18 parts of nitrogen, 13 parts of monovinylacetylene, and 5 parts of hydrogen fluoride is passed at about 50 seconds contact time at about 50° C. through said catalyst. During the run, which lasts about 25 hours, catalyst activity increases continually with time, the first product containing about 45% of fluoroprene, and the last, about 65%.

Comparison of this result with the performance of a charcoal-supported mercuric catalyst clearly demonstrates the advantages afforded by the present catalytic composition. Thus, when a catalyst prepared by impregnating charcoal with mercuric nitrate solution (about 100 g. total mercury per liter of charcoal) and then roasting at 200° C. (the finished product containing about 30 g. total mercury per liter) is employed in the fluoroprene synthesis in the same manner as said calcium fluoride-mercuric catalyst, the conversion of monovinylacetylene to fluoroprene decreases rapidly. This is evidenced by the fact that the initial product obtained with said charcoal-supported catalyst contains about 95% of fluoroprene while that which is obtained after about 20 hours contains about 30% of fluoroprene.

Example III

Mercuric oxide (300 parts) is dissolved in 280 parts of concentrated nitric acid and mixed with 1500 parts of plaster of Paris ($2CaSO_4:H_2O$) and 600 parts of water to form a thin paste or slurry. As the mixture begins to harden but while still plastic, it is forced through a ¼″ mesh screen. The hardened particles are again forced through the ¼″ screen and all pieces which pass through a ⅛″ screen are discarded. The ⅛″–¼″ particles (of various lengths up to a maximum of 1″) are roasted at 165° C. until dry, so as to expel the free and combined water and to decompose the mercuric nitrate. The finished product contains about 140 g. total mercury per liter. When this catalyst is used for the synthesis of fluoroprene, its activity remains substantially constant, the conversion of monovinylacetylene to fluoroprene remaining at a substantially uniform level of 31% throughout a run lasting 64 hours.

While my preferred carrier or support comprises a finely-divided sulfate of calcium, other alkaline earth metal salts or mixtures thereof are also contemplated for use. Thus, the relatively insoluble salts of barium and strontium, and especially the neutral fluorides, sulfates and phosphates of calcium, strontium and barium, are advantageously useful. Among specific examples of these salts may be mentioned calcium sulfate (including anhydrite, plaster of Paris, and gypsum), calcium fluoride (fluorite), calcium phosphate (including its tri, pyro and meta forms); barium fluoride, barium phosphate (including the pyro and tri forms thereof) and barium sulfate (baryte); strontium fluoride, strontium sulfate and strontium phosphate, etc. These salts are particularly suitable for use because they are substantially inert toward the mercury compound present in the catalyst composition and are non-reactive with hydrogen fluoride employed in a vinyl fluoride synthesis.

While mercuric nitrate comprises a preferred type of mercury salt for use in the invention, other sources of the mercury component of the catalyst, such as the acetate, nitrate, basic nitrates, carbonate, and oxides of mercury, may be used. The nitrate is preferred because it may be applied in solution, thus insuring a uniform distribution of the compound throughout the catalyst mass. Moreover, catalysts prepared from the nitrate are more active than the others. When basic nitrates are employed, they may be prepared by grinding together an equimolecular mixture of concentrated nitric acid and mercuric oxide, or, if preferred, may be prepared by adding an alkali hydroxide solution to a well-stirred solution of mercuric nitrate in dilute nitric acid in the proportion of 1 mol of alkali hydroxide to 1 mol of mercuric nitrate, in addition to the alkali required to neutralize the nitric acid present. The acetate, although it may be used in solution, is somewhat less satisfactory due to its tendency to liberate free mercury during the roasting operation. This, however, is much less pronounced than is the case when charcoal supports are employed. The insoluble basic nitrate, carbonate and oxides may be mixed in the presence of water with the alkaline earth metal salt support, as already indicated.

The manner of mixing the mercuric component with the support is influenced by the nature of the materials. As already noted, in the case of calcium sulfate, the inexpensive and commercially available plaster of Paris may be used, taking advantage of the property of this plaster when wet with water, to set to a hard mass. The mercuric compound in solution of or mixed with water may be stirred with the dry, powdered plaster and spread out in a layer to harden. When hard, the mass may be broken up and classified as to particle size, or the wet plastic mass may be forced through openings of convenient size as it is hardening in order to obtain particles of the desired dimensions. Dry powders such as calcium fluoride and barium sulfate which when wet with water do not form hard products may be mixed with water and the mercuric compound to give a paste and formed under pressure into pellets suitable for use as catalysts after heating. A support such as calcium fluoride, which when formed by precipitation gives a gelatinous precipitate, may be mixed in the latter condition with the mercuric component and dried. Porous, low density compositions especially desired for vapor phase catalysis may thus be obtained.

While temperatures ranging from 165°–200° C. are preferred for use because optimum results accrue therefrom, the invention is not limited thereto since the temperature of roasting to which the mercury-impregnated alkaline earth salt is subjected may vary over a wide range of temperature and is dependent upon several conditions. The final composition must be substantially dry and, if mercury nitrate, acetate or carbonate is used as a mercury source, the temperature used must be high enough to cause their decomposition to an active form. Since hydrated calcium sulfate must be heated to a higher temperature (165° C.) than any of the other supports for complete drying, and since this temperature is high enough to effect decomposition of the nitrate, acetate and carbonate of mercury, this temperature comprises a most convenient roasting temperature for all the combinations. However, higher temperatures, and in excess of 200° C. can be used and with desired effects, although temperatures above about 400° C. should not be used for long periods because thermal decomposition of mercuric oxide with loss of free mercury becomes appreciable at these higher temperatures. Moreover, such higher order of temperatures should be avoided because they may lower the mechanical strength of the compositions. Temperatures lower than 165° C. and to, say, about 95° C., or even lower, may be used in some cases. Thus, a pelleted mercuric basic nitrate-barium sulfate composition can be dried over a desiccant in vacuo at ordinary room temperature, since high temperatures are not required to decompose the mercuric component and barium sulfate does not form a difficultly decomposable hydrate.

The roasting operation may be conducted at either atmospheric, superatmospheric, or subatmospheric pressures. For reasons of economy, I prefer to operate at atmospheric pressure in which instance, as above noted, a stream of dry air passing through the reaction mass is used to remove moisture and the gases given off during the roasting operation. This is also desirable when superatmospheric pressures are used but is unnecessary in instances where subatmospheric pressures prevail, due to the fact that any vapors evolved are removed by the vacuum system.

As stated above, the catalytic compositions of my invention are especially useful and efficient in the synthesis of fluoroprene by the vapor phase reaction of monovinylacetylene and hydrogen fluoride, and in the condensation of an acetylene with hydrogen fluoride to obtain a vinyl fluoride. Unsaturated fluorohydrocarbons are of considerable technical importance and commercial value. Fluoroprene is particularly important as an intermediate in the preparation of rubber-like polymers possessing very useful and unusual properties. Thus, fluoroprene polymers can be cured after addition of suitable compounding ingredients to yield strong, highly elastic vulcanizates.

While notably useful in fluoroprene, and vinyl fluoride synthesis, my novel catalytic composition is also useful for promoting conversions to the corresponding substituted or unsubstituted fluorides of hydrocarbons containing an acetylenic unsaturation (including acetylene, methyl acetylene, phenyl acetylene, and substituted monovinyl acetylenes of the formula $$R-CH=C-C\equiv CH$$
$$\phantom{R-CH=}|$$
$$\phantom{R-CH=}R'$$

wherein at least one of the radicals R and R' is a monovalent, saturated hydrocarbon radical, provided the molecular weight of the substituted monovinyl acetylene does not exceed 150; R or R' being either methyl, ethyl, propyl, butyl, isobutyl, amyl, hexyl, cyclohexyl, etc.). Conversion of the hydrocarbon can be effected by passing the hydrocarbon-hydrogen fluoride reaction mixture over the catalytic composition, preferably while in the vapor phase and at a controlled rate of flow. The reaction may be conducted at any desired temperature, the preferred temperature range, however, being from about 20° C. to about 100° C. Higher temperatures and up to 150° C. or even higher may be used but are not recommended for employment because the catalyst becomes less active at such temperatures. Generally, I prefer to use in these reactions substantially chemical equivalent quantities of hydrogen fluoride and the acetylenic compound, i. e., mol for mol, in order to obtain maximum yields of the desired vinyl fluoride. However, an excess of either reactant may be used, if desired. The conversion reaction is preferably effected at atmospheric pressure but subatmospheric or superatmospheric pressures may also be used. The only limitation is that the reactants and products must remain gaseous under the combination of temperature and pressure employed.

I claim as my invention:

1. A process for synthesizing a vinyl fluoride which comprises subjecting in the vapor phase and at temperatures ranging from 20° C. to 150° C., an acetylenic hydrocarbon in admixture with hydrogen fluoride to contact with a catalytic composition consisting of mercury oxide at least partially combined chemically with an oxide of nitrogen supported on a water-insoluble alkaline earth metal salt as a carrier, which salt is substantially unreactive with said hydrogen fluoride and with said mercury compound and is selected from the group consisting of a fluoride, sulfate and phosphate, said catalytic composition having been obtained by roasting a mixture of a thermally-decomposable mercury compound with said alkaline earth metal salt, at temperatures from about 95° C.–400° C. and until the moisture content of the reaction mass is below about 2%.

2. A process for synthesizing fluoroprene which comprises subjecting, in the vapor phase and at temperatures ranging from 20° C. to 150° C., a mixture of monovinyl acetylene and hydrogen fluoride to contact with a conversion catalyst consisting of mercury oxide at least partially combined chemically with an oxide of nitrogen supported on a water-insoluble alkaline earth metal salt as a carrier, which salt is substantially unreactive with said hydrogen fluoride and with said mercury compound and is selected from the group consisting of a fluoride, sulfate and phosphate, said catalytic composition having been obtained by roasting a mixture of a thermally-decomposable mercury compound with said alkaline earth metal salt, at temperatures from about 95° C.–400° C. and until the moisture content of the reaction mass is below about 2%.

3. A process for synthesizing fluoroprene which comprises reacting in the vapor phase and at temperatures ranging from 20° C. to 150° C. a mixture of monovinyl acetylene and hydrogen fluoride in contact with a catalytic composition consisting of mercury oxide at least partially combined chemically with an oxide of nitrogen supported on calcium sulfate, said catalytic composition having been obtained by roasting a mercury nitrate-calcium sulfate slurry suspension at temperatures ranging from 165° C.-200° C. until the moisture content of the reaction mass is below about 2%.

4. A process for synthesizing fluoroprene which comprises reacting in the vapor phase and at temperatures ranging from 20° C. to 150° C. a mixture of monovinyl acetylene and hydrogen fluoride in contact with a catalytic composition consisting of mercury oxide at least partially combined chemically with an oxide of nitrogen supported on calcium fluoride, said catalytic composition having been obtained by roasting a mercury nitrate-calcium fluoride slurry suspension at temperatures ranging from 165° C.-200° C. until the moisture content of the reaction mass is below about 2%.

ARTHUR LIVINGSTON BARNEY.

REFERENCES CITED

The following references are of record in the file of this patent:

UNITED STATES PATENTS

| Number | Name | Date |
| --- | --- | --- |
| 1,950,431 | Carothers et al. | Mar. 13, 1934 |
| 2,013,035 | Dandt | Sept. 3, 1935 |
| 2,118,901 | Soll | May 31, 1938 |
| 2,209,492 | Spicer | July 30, 1940 |
| 2,270,165 | Groll et al. | Jan. 13, 1942 |
| 2,367,877 | Layng | Jan. 23, 1945 |